United States Patent [19]
Davis

[11] 3,747,612
[45] July 24, 1973

[54] DENTAL INSTRUMENT
[76] Inventor: Donald E. Davis, 2115 Cowper Dr., Raleigh, N.C.
[22] Filed: Feb. 11, 1972
[21] Appl. No.: 225,529

[52] U.S. Cl. .......................................... 132/92 R
[51] Int. Cl. ............................................ A61c 15/00
[58] Field of Search .................. 132/89; 32/40, 91, 32/92 R

[56] References Cited
UNITED STATES PATENTS
1,582,000 4/1926 Gesell .............................. 132/92 R
867,264 10/1907 Evans ............................... 132/92 R
2,467,221 4/1949 Pastl ................................ 132/92 R Primary Examiner—Robert Peshock
Attorney—John G. Mills, III

[57] ABSTRACT

In abstract, a preferred embodiment of this invention is a handle for manipulating dental floss in the form of a pair of prongs joined into a single handle. The prongs are adapted to be placed on opposite sides of the user's teeth to aid in the flossing thereof.

1 Claim, 8 Drawing Figures

Patented July 24, 1973  3,747,612
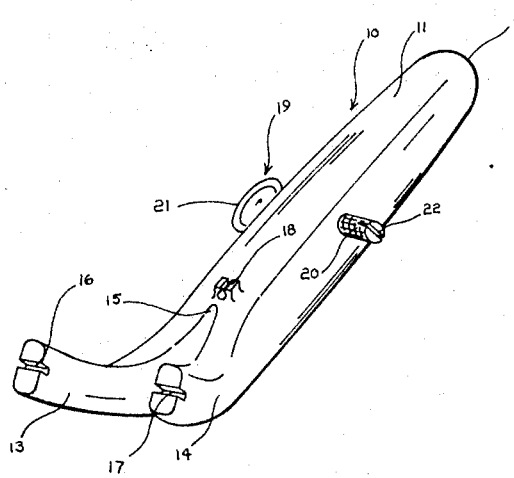
fig.1
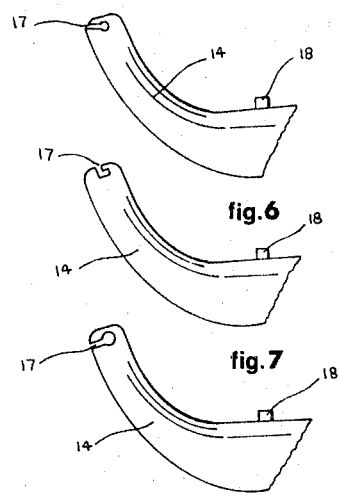
fig.6
fig.7
fig.8
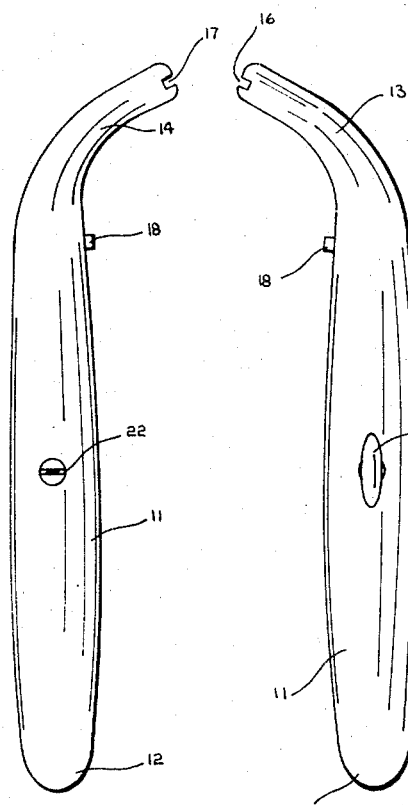
fig.2   fig.3
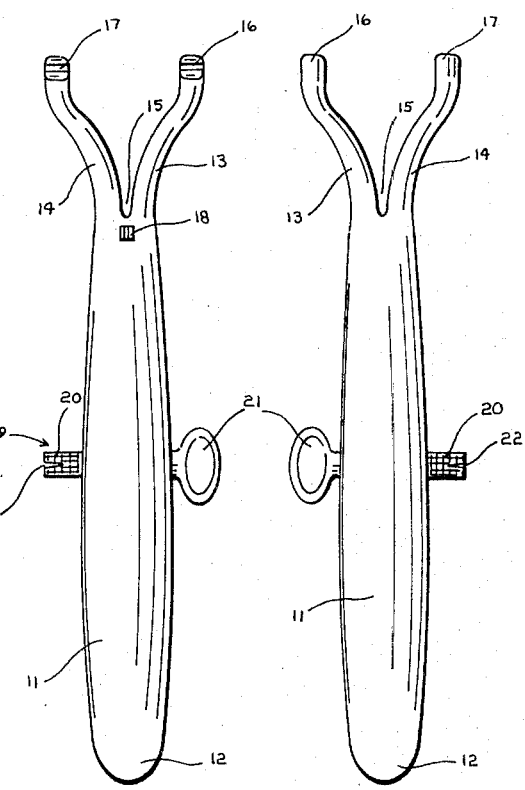
fig.4   fig.5

DENTAL INSTRUMENT

This invention relates to dental applicances and more particularly to devices for aiding in the flossing of teeth.

In the past, dental floss, particularly waxed dental floss, has been widely used to remove particles of food and other foreign matter that becomes lodged between the teeth.

As a result of dental research conducted in recent years, it has been determined that the regular use of dental floss on a daily basis will remove plaque from the surfaces of the teeth and thus prevent excessive build-ups of such substance. This dental hygiene not only tends to eliminate the necessity for periodical professional cleaning of the tooth surfaces but also greatly reduces, if not completely eliminates, the incident of gum infection caused by plaque build-up. Also the regular use of dental floss has been found to substantially eliminate cavities in the teeth.

Through the research mentioned above, it has been noted that relatively fine, unwaxed dental floss is most effective. This non-waxed dental floss is commercially available and usually is in the form of slightly twisted fibers of the approximate size of course sewing thread. In normal use of dental floss, a length of 12 to 18 inches is cut off and each end of this piece is wrapped around an index finger of the user. The fingers are then placed in the mouth on either side of the teeth and the floss is pulled through so that it will slide down between the teeth to the area adjacent the gum. The floss is then pressed against one of the teeth and is pulled outwardly from the gum toward the crown of the tooth. Thus a scrapping motion is created which removes plaque and other foreign matter from the surface of the tooth. This procedure is continued until the adjoining surfaces of all of the teeth have been cleaned.

To clean the front teeth of a person in the manner hereinabove described presents no great problem. The further back in the mouth the teeth are located, however, the greater the cleaning problem presented. The reason for this, of course, is that a finger from each hand of the user must be placed simultaneously in the mouth. For people with relatively small hands, a problem is encountered in cleaning the back teeth which invariably are the ones that need cleaning the most. For people with extra large hands, the cleaning process in this area becomes extremely difficulty if not impossible.

After much research and study into the above mentioned problems, the present invention has been developed to provide a relatively compact instrument for aiding in the flossing of teeth. This device is scientifically proportioned to allow for effective cleaning movement without being excessively large so as to be inconvenient to handle. Because of the structure and method of operation of the instrument of the present invention, motions and tensions used in ordinary hand flossing can be duplicated.

In view of the above, it is an object of the present invention to provide a dental instrument for aiding the flossing of teeth.

Another object of the present invention is to provide a fork shaped instrument for controllingly holding dental floss while the same is being used to remove plaque and other foreign substances from the surface of teeth.

Another object of the present invention is to provide a dental type flossing instrument including means for selectively securing, tensioning and taking up of a floss-like material.

A further object of the present invention is to provide a flossing type dental instrument including means for readily changing the exposed floss material to remove used portions thereof and to present an unused portion to the tooth surface being cleaned.

An additional object of the present invention is to provide a flossing type dental instruments wherein the dental floss used therewith is so threaded that it does not interfere with the use of the instrument.

Another object of the present invention is to provide a dental floss manipulating instrument in the form of a handle with a forked prong at the end thereof whereby remote back teeth can be more readily cleaned.

Another object of the present invention is to provide, in a dental flossing instrument, a knurled, key-like member for holdingly securing one end of the floss material.

Another object of the present invention is to provide, in a dental flossing instrument, a grooved end portion for allowing the floss to be more easily manipulated in the area of the teeth to be cleaned.

Other objects and advantages of the present invention will become apparent and obvious from a study of the following description and the accompanying drawings which are merely illustrative of such invention.

In the drawings:

FIG. 1 is a perspective view of the dental flossing instrument of the present invention;

FIG. 2 is a side elevational view of such instrument;

FIG. 3 is an opposite side elevational view of the same;

FIG. 4 is a plan view of the present invention;

FIG. 5 is an opposite plan view of the same;

FIG. 6 is a modified prong tip;

FIG. 7 is a further modified prong tip; and

FIG. 8 is an even further modified prong tip.

With further reference to the drawings, the dental applicance of the present invention, indicated generally at 10, includes a handle portion 11 which terminates at one end in a generally rounded configuration 12. The opposite end of the handle terminates in a pair of curved, fork-like prongs 13 and 14.

The area 15 where the prongs separate from handle 11 is slightly curved to prevent the accumulation of foreign matter therebetween and aid in the cleaning and maintaining of a sanitary condition of the instrument.

The end of each of the prongs 13 and 14, opposite the handle end thereof, terminates in a slot or groove 16 and 17, respectively.

In the area 15 of joinder between prongs 13 and 14 and handle 11, on one side thereof, is a pair of projections which form the sides of the guide indicated at 18. The use of this guide will hereinafter be described in further detail.

Rotatively mounted in and passing through the handle 11 is take-up key 19. This key projects outwardly on both sides of handle 11 with one end being knurled as seen at 20 and the other end terminating in an enlarged, generally flat handle 21. A wedge shaped slot 22 is provided in the end of the knurled portion 20 of key 19 for quick attachment of floss thereto.

To use the dental instrument of the present invention, approximately 18 inches of unwaxed dental floss is removed from a sanitary dispenser and one end of the same is secured to the instrument 10 by taking two or three turns around the knurled portion 20 of key 19. To start this winding, the floss can first be wedged into slot 20 if desired. The floss is then passed through guide 18 and around the exterior portion of one of the prongs 13 or 14. The floss is placed in the grooves or slots 16 and 17 of the prongs and the loose end of the floss is wound around at least one of the fingers of one hand of the user of the instrument. With the other hand, the instrument 10 is placed in the mouth with the prongs or bow portion being disposed adjacent the teeth with one prong on either side thereof. The floss is pulled tight by a free hand so that such floss can be passed between the teeth to a point juxtaposed to the gum. The tension is then slightly relaxed so that the floss will contact as much tooth surface as possible. While maintaining pressure of the floss against the tooth, such floss is drawn away from the gum surface toward the crown of the tooth by manipulation of instrument 10. This movement of the floss along the tooth surface removes not only the plaque on the surfaces but also any other foreign matter that happens to be lodged thereagainst.

As is the case with the use of dental floss generally, should the floss not pass freely between the teeth when inserting or removing a gentle sawing motion is used, taking care not to cut the gum. As the surface of each tooth is cleaned, the instrument of the present invention is moved to the next tooth and so on until such time as cleaning of all the teeth has been completed.

As plaque and other foreign matter builds up on the floss disposed between the ends of the bow or prong portion of the instrument, all that is necessary to present a new, unused floss is to windingly turn key 19 by twisting handle 21. As the floss winds onto the knurled portion 20, an unused portion of floss is presented. Once the entire useable length of the floss has been used, the floss can be unwound from the key and removed with a new piece being substituted therefore as described above.

Although the key 19 is preferably snugly mounted through handle 11 so that tension placed on the floss during the use of the instrument will not unwind the same, such key can obviously be held against rotation by the hand of the user of the instrument. Likewise, means can be provided for unidirectional rotation of the key such as a ratcheting system (not shown) within the handle itself.

The free or tensioning hand of the user of the instrument, of course, can be reversed at will depending on which side of the mouth is being cleaned. Also changing of the hand holding the instrument is required when going from upper to lower teeth or vice versa.

All that is required to reverse the side upon which the tension hand is operated is to remove the floss from the prongs and feed it back through the slots in the opposite direction. Since guide 18 is centrally disposed, which side the floss passes out on is immaterial.

Other than the above indicated reason, guide 18 serves the purpose of causing the floss to lie close to the surface of the instrument as it is used. This prevents uncomfortable contact of the flow with fleshly portions of the mouth and lips. Such undesirable contact, if allowed to happen, not only could prove uncomfortable but also could cause very painful and dangerous cuts in such fleshy portions.

Although floss guide slots 16 and 17 shown in FIGS. 1 through 5 are considered adequate for the purposes described, additional advantages can be seen in the self-retaining slots disclosed in FIGS. 6 through 8. Since these slots are believed to be self-explanatory, further description of the same and the benefits of each will not be dwelt upon.

It is obvious that the instrument of the present invention can be manufactured from commonly available plastic material, from metal, or from other substances as desired.

As is the case with toothbrushes, various sizes of instruments are needed depending on the size of the mouth and teeth of the user. The length of the handle, the shape of the bow and similar dimensions obviously can be varied as required. Also it is anticipated that a single handle could be useable for a plurality of varying size bows or prongs. It is also anticipated that a package or container of floss can be mounted on or within the handle 11 to expedite the use of the instrument of the present invention.

Similar to the present practice for toothbrushes, varying colors or other identifying means can be provided for identifying which instrument belongs to which member of a family. Further, the handles of children's instruments can be made in animal shapes to make flossing of the teeth a more pleasant and enjoyable experience.

From the above, it is obvious that the present invention has the advantage of providing an efficient and effective means for flossing the teeth of a user thereof to remove plaque and other foreign matter. The present invention is also inexpensive to manufacture and simple to use while at the same time greatly reduces the time required for floss cleaning. The present invention further has the advantage of being produceable in a variety of shapes, colors and sizes for better accomplishing its intended use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An instrument useful in manipulating dental floss during the cleaning of teeth therewith comprising: an elongated handle portion; a pair of prong like members having first portions extending generally outwardly from said elongated handle portion in such a manner as to define a V-shaped area therebetween, and second end portions turned inwardly from said first portions such that said second end portions are disposed in general parallel relationships; a radially open floss guide formed in the end of each second end portion of said prong like members, each radially open floss guide being transversely aligned with the other; a rotatively mounted key-like member extending transversely through said elongated handle and including an exposed knurled portion extending outwardly from said handle and having a V-shaped floss attaching notch formed in the end thereof for attaching one end of the dental floss segment thereto; and an intermediate radially open U-shaped floss guide formed on said elongated handle portion between said key-like member and said prong like members just below the vertex of the V-shaped opening defined by said prong like members, whereby the dental floss extending between said key-like member and said prong like members may be threaded through said intermediate floss guide which assures that the floss extending between the key-like member and said prong like members is maintained closely adjacent said handle portion thereby assuring that the dental floss is maintained close to said instrument and does not hinder the cleaning operation when the instrument is inserted in one's mouth.

* * * * *